(12) United States Patent
Pittala

(10) Patent No.: US 12,515,264 B2
(45) Date of Patent: Jan. 6, 2026

(54) MILLING TOOL WITH COOLANT DISTRIBUTING HOLES

(71) Applicant: AB SANDVIK COROMANT, Sandviken (SE)

(72) Inventor: Gaetano Pittala, Rovereto (IT)

(73) Assignee: AB Sandvik Coromant, Sandviken (SE)

( * ) Notice: Subject to any disclaimer, the term of this patent is extended or adjusted under 35 U.S.C. 154(b) by 573 days.

(21) Appl. No.: 17/609,052

(22) PCT Filed: Apr. 21, 2020

(86) PCT No.: PCT/EP2020/061085
§ 371 (c)(1),
(2) Date: Nov. 5, 2021

(87) PCT Pub. No.: WO2020/224950
PCT Pub. Date: Nov. 12, 2020

(65) Prior Publication Data
US 2022/0203464 A1 Jun. 30, 2022

(30) Foreign Application Priority Data
May 7, 2019 (EP) .................................... 19172899

(51) Int. Cl.
*B23C 5/28* (2006.01)
(52) U.S. Cl.
CPC ............ *B23C 5/28* (2013.01); *B23C 2250/12* (2013.01)

(58) Field of Classification Search
CPC ........ B23C 5/282; B23C 2250/12; B23C 5/28
See application file for complete search history.

(56) References Cited

U.S. PATENT DOCUMENTS

| | | | |
|---|---|---|---|
| 2003/0118411 A1* | 6/2003 | Flynn | ........................ B23C 5/10 407/53 |
| 2009/0142150 A1 | 6/2009 | Chu | |
| 2009/0155008 A1 | 6/2009 | Kopton | |
| 2016/0001381 A1 | 1/2016 | Lach | |

FOREIGN PATENT DOCUMENTS

| | | |
|---|---|---|
| CA | 3030362 A1 | 3/2019 |
| CN | 206326171 U | 7/2017 |
| CN | 108025378 A | 5/2018 |
| EP | 0579371 A1 | 1/1994 |
| EP | 3342518 A1 | 7/2018 |

(Continued)

OTHER PUBLICATIONS

English machine translation of WO 2019145208 (Year: 2019).*
English translation of JP 04336910 (Year: 1992).*

*Primary Examiner* — Alan Snyder
(74) *Attorney, Agent, or Firm* — Corinne R. Gorski

(57) ABSTRACT

A milling tool includes an elongate cutting head having a front end, a rear end, and a longitudinal axis extending therebetween. The cutting head includes a plurality of flutes separated from each other by a corresponding number of intermediate portions, wherein the flutes extend axially along the cutting head. The cutting head has a coolant distributing through-hole extending between two adjacent flutes through the intermediate portion located therebetween, for influencing the distribution of coolant provided to the milling tool.

14 Claims, 3 Drawing Sheets

(56) References Cited

FOREIGN PATENT DOCUMENTS

| | | | |
|---|---|---|---|
| GB | 11673 A | 11/1910 | |
| JP | 04336910 A | * 11/1992 | ............... B23C 5/28 |
| JP | 2002046008 A | 2/2002 | |
| JP | 2009078330 A | 4/2009 | |
| JP | 5286928 B2 | 9/2013 | |
| JP | 2015093347 A | 5/2015 | |
| WO | 2019145208 A1 | 8/2019 | |

* cited by examiner

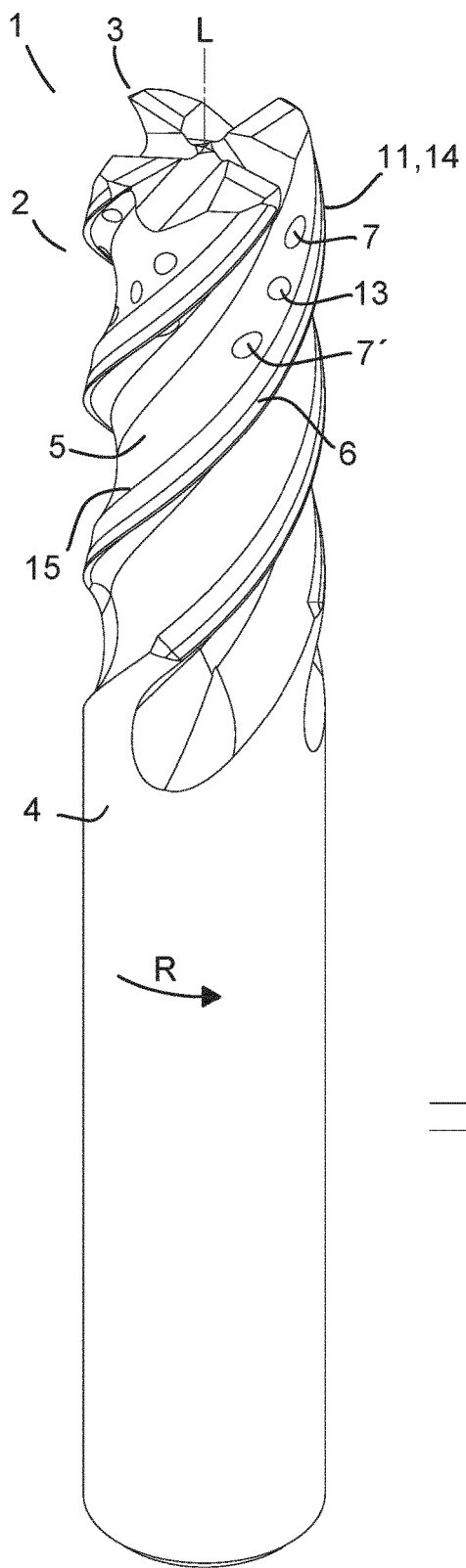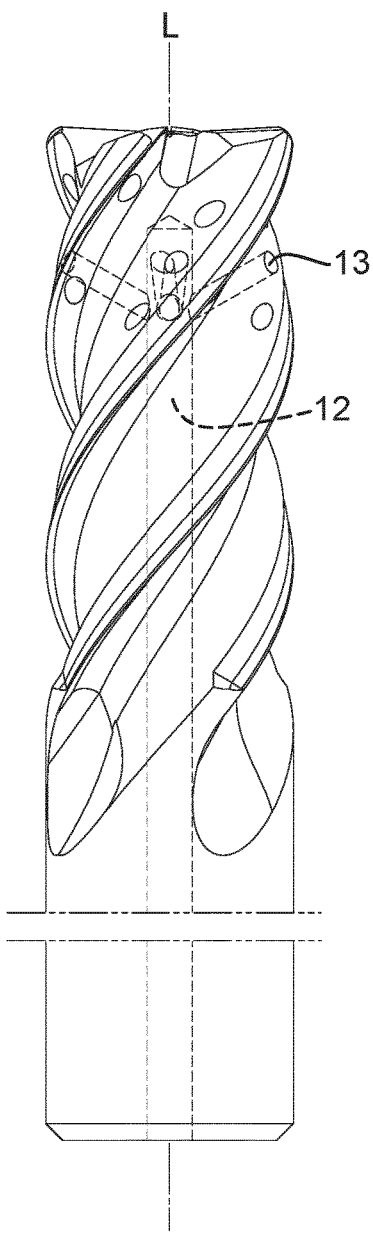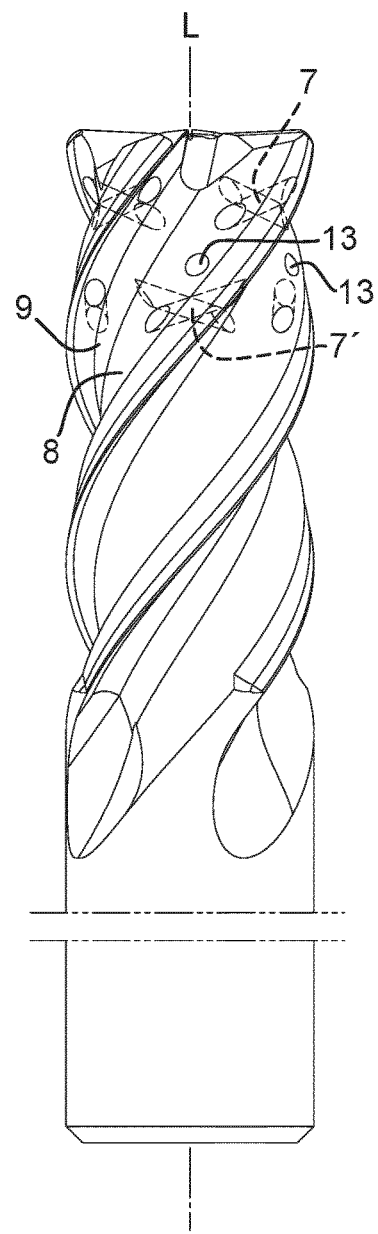
Fig 1
Fig 2
Fig 3

MILLING TOOL WITH COOLANT DISTRIBUTING HOLES

RELATED APPLICATION DATA

This application is a § 371 National Stage Application of PCT International Application No. PCT/EP2020/061085 filed Apr. 21, 2020 claiming priority to EP 19172899.7 filed May 7, 2019.

TECHNICAL FIELD

The invention relates to milling tools for machining with coolant supply.

BACKGROUND ART

A wide range of components are machined from many different types of material, with each material having different physical and mechanical characteristics that are influenced by alloying elements, heat treatment, hardness etc. Accordingly, a variety of different cutting tools, such as rotary milling tools, have been developed to machine workpiece materials. Conventionally, a rotary milling tool comprises a tool body provided with helical or axially straight teeth that are in turn separated by flutes. Due to the considerable thermal stresses at the tool, it is common to deliver liquid coolant to the region of the cutting teeth. The coolant may be provided externally or provided to the flutes through internal coolant channels. Cooling increases the cutting efficiency of the tool and the service lifetime.

EP3342518 discloses a rotary milling tool comprising helical teeth and flutes, wherein coolant is supplied to the cutting region via an axially extending internal bore having respective exit ends at radially inner base regions of the flutes. The milling tool also comprises grooves arranged at the clearance side of each tooth for facilitating delivery of coolant towards the cutting edges. Even though such grooves improve the cooling effect, the tool life of existing milling tools is still limited, particularly when cutting hard-to-machine materials, such as nickel-based alloys or titanium. Hence, there is a need for milling tools having increased tool life.

SUMMARY

It is an object of the present invention to mitigate the shortcomings of the prior art and to provide a milling tool having increased tool life.

Thus, the invention relates to a milling tool comprising an elongate cutting head having a front end, a rear end, and a longitudinal axis extending therebetween. The cutting head comprises a plurality of flutes separated from each other by a corresponding number of intermediate portions, wherein the flutes extend axially along the cutting head. The cutting head further comprises a coolant distributing through-hole extending between two adjacent flutes through the intermediate portion located therebetween.

Hence, the coolant distributing through-hole extends from one flute to an adjacent flute.

Such coolant distributing through-hole will influence the distribution of coolant provided to the cutting tool. The through-hole will result in an efficient distribution of coolant and increase the time that the coolant stays in the cutting zone. Normally, the centrifugal force tends to push the coolant out from the cutting zone, but the through-hole will help the coolant to remain for a longer time in the region where it is needed. This will improve the cooling effect and thereby increase the tool life.

The milling tool may be any elongated milling tool for metal cutting, such as, for example, an end mill. The cutting head may be an integral part of the milling tool. Hence, as an example, the milling tool may be a solid milling cutter comprising a shank integrally formed with a cutting head comprising teeth with cutting edges. Alternatively, the cutting head may be a detachable cutting head that can be arranged to a shank, for example by a threaded connection. Thus, as an example, the milling tool may be a detachable and/or exchangeable milling cutting head, with or without a shank attached thereto.

The front end of the cutting head is the end at the cutting side, and the rear end is the end closer to the shank side of the cutting head.

Throughout this specification, any references to an axial-, tangential- and/or radial direction, for example when referring to a distance or spacing between elements, are made with respect to a cutting head and the longitudinal axis thereof.

The milling tool, or at least the parts thereof that are arranged to engage a workpiece during a cutting process, may be made of cemented carbide.

The flutes may be helical such that the flutes and the intermediate portions extend axially along the cutting edge following a curved helical path around the longitudinal axis of the cutting head, with this path deviating from the axis by a helix angle. Alternatively, the flutes may be straight, i.e. aligned generally parallel to the longitudinal axis of the milling tool.

Coolant may be provided to the milling tool either internally, through one or more channels inside the milling tool, or externally, through a separate coolant distributing arrangement, and for example distributed via a nozzle that is directed towards the milling tool.

"Intermediate portions", as used herein when referring to specific parts of a milling tool, is to be understood as the parts located between adjacent flutes. Stated differently, the intermediate portions are the parts of the tool head that extend radially from the longitudinal axis beyond the core of the tool head. Hence, for a solid milling cutter, each intermediate portion would normally comprise a tooth having a cutting edge and a clearance face following the cutting edge. For a milling tool with exchangeable and/or indexable cutting inserts, each intermediate portion would normally include a region comprising one or more pockets for accommodating the cutting insert(s).

Each intermediate portion may comprise a leading side and a trailing side, wherein the leading side is located forward of the trailing side in the tool rotation direction. Accordingly, each intermediate portion comprises a leading edge at the intersection between the leading side of the intermediate portion and a radially outer part of the intermediate portion. For a solid milling cutter, such leading edge corresponds to a cutting edge. Each flute may also be considered to comprise a leading flute surface portion and a trailing flute surface portion, for example corresponding to a first half and a second half of the flute, respectively, wherein the first half is located forward of the second half in the tool rotation direction. In other words, the leading flute surface portion may correspond to the trailing side of the intermediate portion that is adjacent to the flute in the tool rotation direction, and the trailing flute surface portion may correspond to the leading side of the intermediate portion that is adjacent to the flute in the direction opposite to the tool rotation direction.

The through-hole may extend from the trailing flute surface portion of a first flute to the leading flute surface portion of a second flute through the intermediate portion located therebetween. A leading edge of the intermediate portion may be defined at an intersection of the trailing flute surface portion of the first flute and a radially outwards facing part of the intermediate portion. Correspondingly, a trailing edge of the intermediate portion may be defined at an intersection of the leading flute surface portion of the second flute and the radially outwards facing part of the intermediate portion.

For a solid milling cutter, the leading edge would normally correspond to a cutting edge, and the radially outwards part of the intermediate portion would include the clearance face. Accordingly, the trailing edge would normally correspond to a transition between the clearance face (i.e. the region following the cutting edge and any margin) and the flute that follows the intermediate portion. This transition may be a distinct edge. However, the transition may also be a smooth transition comprising a radius. In such case, the trailing edge may be defined as the beginning of the transition from the radially outwards facing part of the intermediate portion to the flute. For example, the trailing edge may be considered as the position at which the clearance face ends, i.e. the position where a radius that connects the clearance face and the flute starts.

The through-hole may extend at an angle $\alpha$ to a radial line that is perpendicular to a line passing through the leading edge and the trailing edge at axial locations corresponding to the location of the through-hole, wherein $80° \leq \alpha \leq 90°$. The extension of the through-hole is defined as the extension of a straight line between the centers of the respective openings of the through-hole. Hence, for a straight through-hole, the extension angle $\alpha$ for the center-line of the through-hole is constant all along its extension. For a curved through-hole, the extension angle $\alpha$ will correspond to an overall, average, extension of the center-line of the through-hole, for example with an extension continuously changing from above $\alpha$, at the beginning of the through-hole, to below $\alpha$, at the end of the through-hole. The distribution of coolant is believed to be most efficient within the interval $80° \leq \alpha \leq 90°$. Hence, the angle $\alpha$ may be 90°, or substantially 90°, such that the through-hole extends perpendicularly to the radial line, i.e. in a direction parallel to the line passing through the leading edge and the trailing edge. Such angle may also facilitate a position of the through-hole that is close to the cutting edge but at the same time without risking that any part of the through-hole is so close to the clearance face that the robustness of the tool is compromised.

The through-hole may extend at an angle $\beta$ to a line parallel to the longitudinal axis, wherein $60° \leq \beta \leq 90°$. Within this interval, the distribution of coolant is believed to be most efficient. Hence, for example, the through-hole may extend in a plane that is perpendicular to the longitudinal axis, but may also be inclined towards the rear end of the cutting head, for example by an angle $\beta$ of 70°.

The through-hole may be circularly, or substantially circularly, shaped and may have a diameter d in a cross-section perpendicular to the extension of the through-hole. Accordingly, the through-hole may have the shape of a cylinder, and in particular a circular cylinder. A circular cross-sectional shape of the through-hole will provide satisfactory coolant flow and a circular cylindrical shape is advantageous from a manufacturing point of view, since the through-hole can be created by drilling, for example. Alternatively, the diameter d of the through-hole may be non-constant, such that the cross-sectional area of the through-hole varies along its extension. For example, the through-hole may be cone-shaped.

The diameter d of the through-hole may be selected based on various parameters, such as, for example, the diameter of the milling tool, the diameter of an internal coolant channel that provides coolant to the milling tool, and the axial position of the through-hole. For example, the diameter d of the through-hole may be between 0.5 and 1.5 mm, for example 1 mm.

The through-hole may be radially spaced from the leading edge of the intermediate portion in a direction towards the longitudinal axis such that the radial distance between the leading edge and the center of the through-hole corresponds to, or is greater than, the diameter d of the through-hole. Thus, there will be a minimum distance between any part of the through-hole and the leading edge which is at least of the same magnitude as the radius of the through-hole. Such minimum distance will ensure that the milling tool maintains the robustness that is required for metal cutting and reduces the risk of tool breakage. On the other hand, it may be beneficial to arrange the through-holes relatively close to the leading edge. Thus, as an example, the radial distance between the leading edge and the center of the through-hole may be smaller than twice the diameter d of the through-hole. Thereby, a good cooling effect will be achieved. Hence, the radial distance between the leading edge and the center of the through-hole may be greater than the diameter d of the through-hole, but smaller than twice the diameter of the through-hole.

The through-hole may extend along a straight line. Such design is beneficial due to the ease of manufacture since the through-hole may be drilled. Alternatively, the through-hole may extend along a curved path which, when viewed from a direction along the longitudinal axis, has a curvature that corresponds to, or substantially corresponds to, the curvature of an envelope surface of the milling tool. A curved through-hole may provide an improved distribution of coolant. A design with a curved through-hole can be obtained if the milling tool, or a cutting head or at least parts thereof, is manufactured by using additive manufacturing methods, such as, for example, selective laser sintering or electron beam melting. Such techniques are well known in the art and are not further described herein.

The cutting head may comprise one through-hole between any adjacent flutes such that each intermediate portion has at least one through-hole extending therethrough. Thereby, coolant will be efficiently distributed to many different parts of the cutting head. The through-holes may be located at corresponding axial locations along the longitudinal axis, such that a "layer" of through-holes is defined at a certain axial location.

The cutting head may comprise at least a first and a second through-hole extending between the same two adjacent flutes through the intermediate portion located therebetween, wherein the second through-hole is axially spaced from the first through-hole in a forward direction along the longitudinal axis. Thereby, an even better distribution of coolant may be obtained. The first and second through-holes do not necessarily have corresponding dimensions. For example, the diameter of the second through-hole may be smaller than the diameter of the first through-hole. Multiple through-holes may be arranged between any adjacent flutes such that each intermediate portion has a corresponding number of through-holes, for example two through-holes, extending therethrough. Thus, two or more "layers" of through-holes may be defined, wherein the different layers are located at different axial positions along the longitudinal axis.

The milling tool may comprise at least one internal coolant channel extending axially along the cutting head, wherein the channel has at least one terminal end formed as an opening in the surface of at least one of the flutes. Such internal cooling, where the coolant is provided through channels inside the tool, may increase the cooling effect compared to external cooling, where coolant is provided externally and directed towards the cutting tool.

According to some embodiments, the opening is located in the leading flute surface portion of the flute. Thus, the coolant will emerge in the flute at the trailing side of the intermediate portion, i.e. at the clearance side (also referred to as relief side). For a solid milling cutter, as an example, the trailing side of the intermediate portion would correspond to the side following, with respect to the tool rotation direction, the clearance face of the intermediate portion. This will provide good cooling without increasing tool wear at the relief side of the intermediate portion. This is because coolant, if directly directed towards the leading edge, may increase the speed of particles generated during machining that may damage the relief side of the intermediate portion, in particular when machining hard-to-machine materials. However, if directing the coolant to the clearance side of the intermediate portion, the particles may be slowed down, and the tool wear reduced. Due to the through-hole, the cooling effect will be maintained since coolant will be efficiently conveyed to regions close to the leading edge.

The opening may be located at a different axial location along the longitudinal axis than the coolant distributing through-hole. Thereby, the robustness of the tool is maintained since any internal passages inside the cutting head may be evenly distributed along the axial length thereof. In some embodiments, the opening may be axially located halfway, or substantially halfway, between a first and a second through-hole extending through an intermediate portion.

The coolant distributing through-hole does not correspond to, or is formed by, any part of the internal coolant channel. Coolant emerging from the terminal end of the internal coolant channel in the flute may flow towards, and through, the coolant distributing through-hole. However, the coolant distributing through-hole is not directly connected to any part of the internal coolant channel.

In some embodiments, the cross-sectional area of the coolant channel opening may be smaller than the cross-sectional area of a through-hole extending from the flute. However, the opening may also have a cross-sectional area that is greater than the cross-sectional area of any through-hole extending from the flute. This may be particularly beneficial for embodiments where two or more through-holes extend from a flute and may ensure an efficient distribution of coolant. The internal coolant channel may also have multiple terminal ends in the form of openings in the surface of a flute. Irrespective of the number of openings/through-holes, the combined cross-sectional area of the through-holes extending from a flute may be roughly the same as the combined cross-sectional area of the coolant channel openings in the flute. Thus, as an example, the ratio between the combined cross-sectional area of the coolant channel openings in a flute and the combined cross-sectional area of all through-holes extending from the flute may be between 0.5 and 1.5.

The cutting head may be a solid milling tool head wherein each intermediate portion corresponds to a tooth having at least one integrally formed cutting edge.

BRIEF DESCRIPTION OF DRAWINGS

In the following, example embodiments will be described in greater detail and with reference to the accompanying drawings, in which:

FIG. 1 shows a milling tool in the form of a solid end mill with internal cooling and coolant distributing through-holes.

FIG. 2 is a side view of the milling tool in FIG. 1, wherein the internal coolant channels are indicated by dotted lines.

FIG. 3 is a side view of the milling tool in FIG. 1, wherein the coolant distributing through-holes are indicated by dotted lines.

Figure 4:
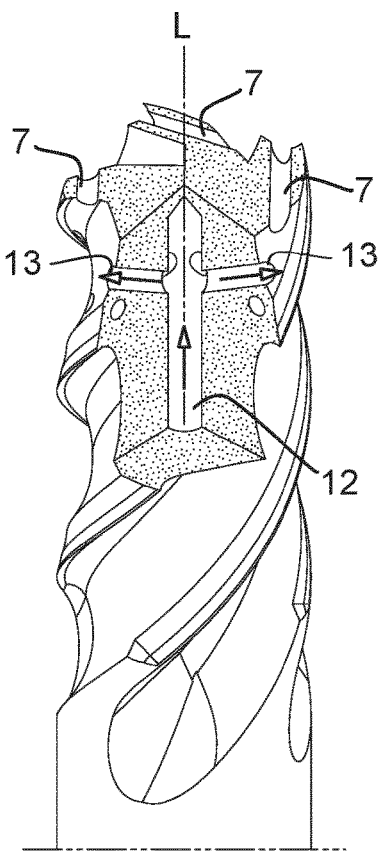
FIG. 4 shows the internal geometry of the milling tool in FIG. 1, wherein some parts are shown in sections which are taken partly along the extension of the through-holes that are closest to the front end of the milling tool, and partly along the extension of an internal coolant channel.

All the figures are schematic, not necessarily to scale, and generally only show parts which are necessary in order to elucidate the respective embodiments, whereas other parts may be omitted or merely suggested. Unless otherwise indicated, like reference numerals refer to like parts in different figures.

DETAILED DESCRIPTION OF EMBODIMENTS

FIGS. 1-7 show a milling tool according to an embodiment of the invention. The milling tool is a solid end mill 1 having a cutting head 2 integrally formed to a shank. The cutting head has a front end 3 and a rear end 4 and a longitudinal axis L extending therebetween. The end mill 1 has four flutes 5, and a corresponding number of intermediate portions 6, corresponding to cutting teeth. The cutting teeth 6 and the flutes 5 extend axially along the cutting head following a curved helical path around the longitudinal axis L of the cutting head. As indicated in FIG. 3, each flute has a leading flute surface portion 8 and a trailing flute surface portion 9, with respect to a tool rotation direction R. A leading edge 11, in this embodiment corresponding to a cutting edge 14, is formed at the intersection of the trailing flute surface portion 9 and a radially outer part of the tooth 6. A radially outwards facing part of each tooth 6 includes a clearance face, i.e. the part of the tooth that, with respect to the tool rotation direction R, follows the cutting edge 14. A trailing edge 15 is defined at an intersection between the clearance face of each tooth 6 and the leading flute surface portion 8 of the flute following the tooth 6. The trailing flute surface portion 9 corresponds to a rake face of the cutting edge 14.

As shown in FIG. 2, the end mill 1 has an internal coolant channel 12 extending axially along the cutting head for conveying coolant to the cutting tool. The coolant channel 12 has four terminal ends formed as openings 13 in the surface of the flutes, such that each flute comprises one coolant channel opening 13. The openings 13 are located in the leading flute surface portion 8 of the respective flutes 5, as best seen in FIGS. 1-3.

The end mill 1 comprises through-holes 7, 7' extending between adjacent flutes 5 through the tooth 6 located therebetween. For each of the teeth 6, two through-holes 7, 7' extend therethrough, wherein one through-hole 7 is axially spaced from the other through-hole 7' in a forward direction along the longitudinal axis. Thereby, as best seen in FIG. 3, two "layers" of through-holes 7, 7' are defined, one front layer of through-holes 7 and one rear layer of through-holes 7'. Each of the two layers comprises four through-holes, one through each tooth. Each through-hole extends from the trailing flute surface portion 9 of a flute to the leading flute surface portion 8 of an adjacent flute, through the tooth 6 located therebetween.

The coolant channel openings are axially located substantially halfway between the two layers of through-holes 7, 7'. Thereby, the robustness of the end mill is retained as far as possible.

FIG. 4 shows the internal geometry of the end mill. Hence, some parts of the end mill are shown in sections which are taken partly along the extension of the through-holes 7 in the front layer, and partly along the extension of the internal coolant channel 12. The surfaces of these sections are indicated as dotted regions. Arrows in FIG. 4 indicates the flow of coolant conveyed through the internal coolant channel 12 and through the openings 13. The through-holes 7 will provide a passage for coolant between the flutes. Accordingly, coolant will be evenly distributed to the regions where it is needed most, and the time the coolant stays in the cutting zone is increased. The coolant will pass through the through-holes 7 relatively close below the cutting edges, further increasing the cooling effect.

Figure 5:
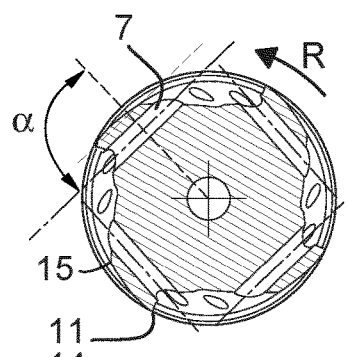
FIG. 5 is a front view of the milling tool in a section along the extension of the through-holes that are closest to the front end of the milling tool, thus substantially corresponding to a front view of the milling tool as shown in FIG. 4.

FIG. 5 is a front view of the end mill in a section through the extension of the four through-holes 7 in the front layer, i.e. substantially corresponding to a front view of the end mill as shown in FIG. 4. As indicated in this figure, each through-hole 7 extends at an angle $\alpha$ to a radial line that is perpendicular to a line passing through the leading edge and the trailing edge at axial locations corresponding to the location of the through-hole. In the embodiment shown, the angle $\alpha$ is close to 90°, such that the through-hole extends perpendicular, or substantially perpendicular, to the radial line shown in FIG. 5. Hence, the through-hole 7 extends in a direction parallel to the line passing through the leading edge and the trailing edge.

Figure 6:
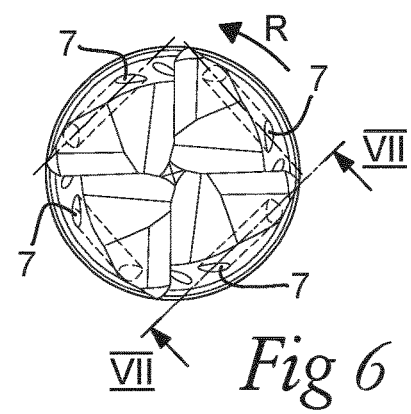
FIG. 6 is a top view of the milling tool in FIG. 1, wherein the coolant distributing through-holes that are closest to the front end of the milling tool are indicated by dotted lines.

FIG. 6 is a front view of the end mill 1 where the through-holes 7 in the front layer are indicated by dotted lines.

Figure 7:
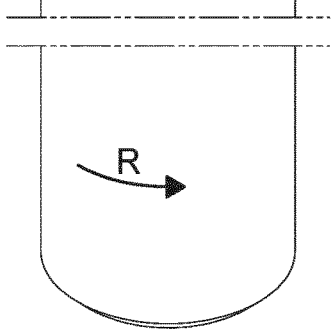
FIG. 7 shows the milling tool in FIG. 1 in a section as indicated in FIG. 6.

FIG. 7 is a side view of the end mill in a section along the extension of one of the through-holes, i.e. in the section VII indicated in FIG. 6. Each through-hole extends at an angle $\beta$ to a line parallel to the longitudinal axis. According to this embodiment, the angle $\beta$ is 70°, or close to 70°. Hence, the coolant passing through the through-hole is directed somewhat towards the front end of the end mill.

The through-holes 7, 7' have a circular cylindrical shape and have a diameter d, as indicated in FIG. 7. The radial distance between the center of the through-hole and the exterior of the end mill, e.g. the cutting edge 14, approximately corresponds to the diameter d of the through-hole. This is best seen in in FIGS. 5 and 6. A shorter distance may result in a tool that is not sufficiently robust, i.e. too fragile. However, too large distance may result in a less efficient cooling and reduce the effect provided by the through-holes.

Figure 8:
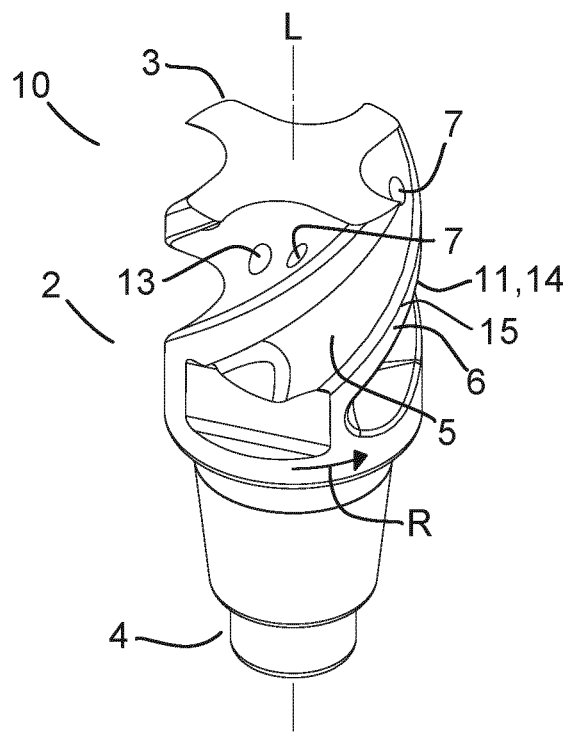
FIG. 8 shows a milling tool in the form of an exchangeable cutting head.
Figure 9:
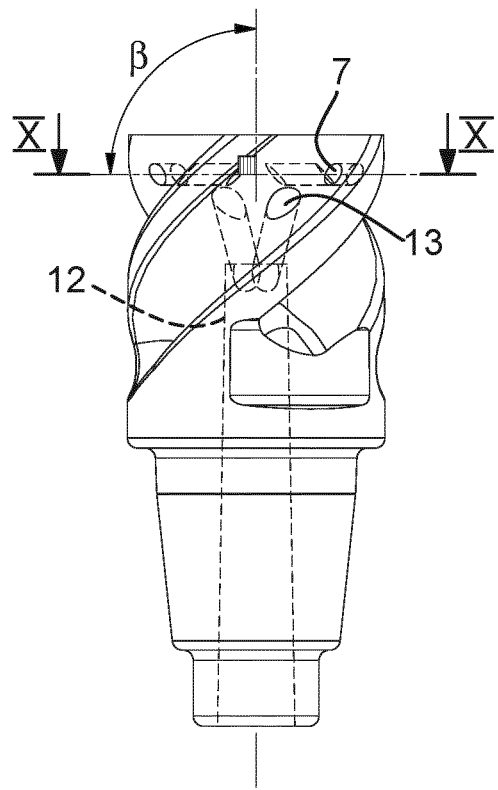
FIG. 9 is a side view of the milling tool in FIG. 8, wherein the coolant distributing through-holes and the internal coolant channels are indicated by dotted lines.
Figure 10:
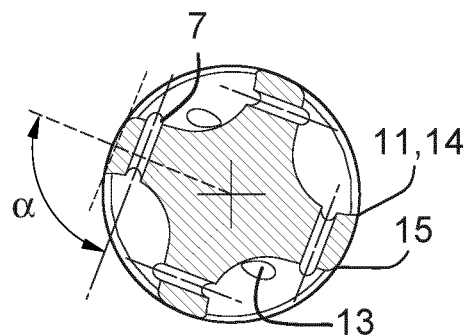
FIG. 10 shows the milling tool in FIG. 8 in a section as indicated in FIG. 9.

FIG. 8-10 show a milling tool 10 according to another embodiment. The milling tool 10 is of the exchangeable head type and comprises a cutting head 2 having an interface at its rear end 4 for coupling to a shank (not shown). The milling tool 10 has four flutes 5 and a corresponding number of intermediate portions 6 in the form of teeth comprising cutting edges 14. An internal coolant channel 12 has two terminal ends in the form of openings 13. Hence, coolant is directly supplied only to two of the four flutes 5. However, there is a through-hole 7 extending between any adjacent flutes 5, such that there is a total of four through-holes 7.

As best seen in FIG. 9, which is a side view of the milling tool 10 and wherein the internal coolant channel 12 and the through-holes are indicated by dotted lines, each through-hole extends perpendicularly to a line parallel to the longitudinal axis, such that the angle $\beta$ is 90°.

FIG. 10 is a front view of the milling tool 10 in a section through the extension of the four through-holes 7, i.e. in a section X indicated in FIG. 9. As indicated in this figure, each through-hole 7 extends at an angle $\alpha$ to a radial line that is perpendicular to a line passing through the leading edge 11 and the trailing edge 15 at axial locations corresponding to the location of the through-hole. In this embodiment, the angle $\alpha$ is approximately 90°.

The invention claimed is:

1. A milling tool comprising an elongate cutting head having a front end, a rear end, and a longitudinal axis extending therebetween, the cutting head including a plurality of flutes separated from each other by a corresponding number of intermediate portions, wherein the flutes extend axially along the cutting head, wherein the flutes are helical such that the flutes and the intermediate portions extend axially following a curved helical path around the longitudinal axis of the cutting head, the path deviating from the axis by a helix angle, and wherein the cutting head further includes at least one coolant distributing through-hole extending between two adjacent flutes through the intermediate portion located therebetween, wherein the coolant distributing through-hole is not directly connected to any axially extending internal coolant channel arranged for conveying coolant through the milling tool, and wherein the at least one coolant distributing through-hole comprises at least a first and a second through-hole extending between the same two adjacent flutes through the intermediate portion located therebetween, wherein the second through-hole is axially spaced from the first through-hole in a forward direction along the longitudinal axis.

2. The milling tool according to claim 1, wherein each flute of the plurality of flutes includes, with respect to a tool rotation direction, a leading flute surface portion and a trailing flute surface portion, and wherein the through-hole extends from the trailing flute surface portion of a first flute of the plurality of flutes to the leading flute surface portion of a second flute of the plurality of flutes through the intermediate portion located therebetween, and wherein a leading edge of the intermediate portion is defined at an intersection of the trailing flute surface portion of the first flute and a radially outwards facing part of the intermediate portion, and wherein a trailing edge of the intermediate portion is defined at an intersection of the leading flute surface portion of the second flute and the radially outwards facing part of the intermediate portion.

3. The milling tool according to claim 2, wherein the through-hole extends at an angle α to a radial line that is perpendicular to a line passing through the leading edge and the trailing edge at axial locations corresponding to the location of the through-hole, wherein $80° \leq \alpha \leq 90°$.

4. The milling tool according to claim 2, wherein the through-hole is radially spaced from the leading edge in a direction towards the longitudinal axis such that the radial distance between the leading edge and the center of the through-hole corresponds to, or is greater than, the diameter d of the through-hole.

5. The milling tool according to claim 1, wherein the through-hole extends at an angle β to a line parallel to the longitudinal axis, wherein $60° \leq \beta \leq 90°$.

6. The milling tool according to claim 1, wherein the through-hole is circularly, or substantially circularly, shaped and has a diameter in a cross-section perpendicular to the extension of the through-hole.

7. The milling tool according to claim 1, wherein the through-hole extends along a curved path which, when viewed from a direction along the longitudinal axis, has a curvature that corresponds to, or substantially corresponds to, a curvature of an envelope surface of the milling tool.

8. The milling tool according to claim 1, wherein the cutting head includes one through-hole between any adjacent flutes such that each intermediate portion has at least one through-hole extending therethrough.

9. The milling tool according to claim 1, further comprising at least one internal coolant channel extending axially along the cutting head, wherein the at least one internal coolant channel has at least one terminal end formed as an opening in a surface of at least one of the plurality of flutes.

10. The milling tool according to claim 9, wherein the opening is located in the leading flute surface portion of the flute.

11. The milling tool according to claim 9, wherein the opening is located at a different axial location along the longitudinal axis than the through-hole.

12. The milling tool according to claim 11, wherein the opening is axially located halfway, or substantially halfway, between the first through-hole and the second throughhole.

13. The milling tool according to claim 9, wherein the opening has a cross-sectional area that is greater than the cross-sectional area of any through-hole extending from the flute.

14. The milling tool according to claim 1, wherein the cutting head is a solid milling tool head, wherein each intermediate portion corresponds to a tooth having at least one integrally formed cutting edge.

* * * * *